United States Patent [19]
Ricci

[11] Patent Number: 5,116,566
[45] Date of Patent: May 26, 1992

[54] CRD MILLING MACHINE

[76] Inventor: Donato L. Ricci, Rte. 1, Box 1067, Hager City, Wis. 54014

[21] Appl. No.: 656,746

[22] Filed: Feb. 19, 1991

[51] Int. Cl.[5] ............................................. G21C 19/00
[52] U.S. Cl. ...................................... 376/260; 376/277
[58] Field of Search ............................... 376/260, 277

[56] References Cited

U.S. PATENT DOCUMENTS 4,748,733 6/1988 Hahn et al. ........................ 376/260

Primary Examiner—Brooks H. Hunt
Assistant Examiner—Frederick H. Voss
Attorney, Agent, or Firm—Haugen and Nikolai

[57] ABSTRACT

An apparatus for refurbishing the ends of control rod drive (CRD) penetrations used in nuclear boiling water reactor systems where the rods are disposed in a grid of rows and columns with a known predetermined spacing therebetween. The apparatus is rapidly positioned for support on a pair of CRDs adjacent to a CRD to be refurbished, coaxially aligning the end mill with the CRD to be refurbished. The end mill is then brought into contact with the CRD to be refurbished. After the refurbishment process, the apparatus is rapidly removed and ready to be positioned on another pair of CRDs adjacent to another CRD to be refubished.

6 Claims, 3 Drawing Sheets

CRD MILLING MACHINE

BACKGROUND OF THE INVENTION

I. Field of the Invention

This invention relates to a machine for milling off old, cracked weld material from control rod drive penetrations used in nuclear boiling water reactor systems and more particularly to a machine that can rapidly be positioned and used so as to reduce the time exposure of workers to nuclear radiation.

II. Discussion of the Prior Art

The control rod drive (CRD) penetrations in a nuclear boiling water reactor (BWR) system have welded end caps. Intergranular stress corrosion cracking, (IGSCC), occurs at the weld interface because of the high heat, radiation, and fatigue environment of nuclear boiling water reactors. The cracked condition must be fixed before the function of the CRD is compromised.

To prevent compromise of the CRDs, one must enter the BWR's dry well, a high radiation area, to remove the old weld material and end caps from the CRD's whose welds exhibit IGSCC and then weld on new end caps. Protective suits are required in this high radiation area and an individual's exposure time in such a high radiation environment is limited by federal regulations. The removal of the old weld material has heretofore been a highly labor intensive procedure using a hack saw and an abrasive disk grinding wheel. Such a method is time consuming, inaccurate and results in air-borne contamination in the form of radioactive dust particles. Because of the limits on radiation exposure mandated by federal regulations, the time involved removing the old weld material necessarily limits the time for welding on the new end cap.

A need exists for a method which reduces time, eliminates inaccuracies and minimizes air borne contamination.

The primary object of this invention is to provide a device which shortens the time for removing old weld material from the CRDs in BWR installations.

Another object is to minimize the amount of air borne radioactive contamination in the form of radioactive dust.

Another object is to provide a manually adjustable device which readily clamps onto CRDs adjacent to the CRD to be milled for support.

SUMMARY OF THE INVENTION

To achieve these and other objects, there is provided a milling apparatus for use on control rod drive penetrations in a nuclear boiling water reactor system. In such systems, CRDs are equally spaced in a grid pattern. The apparatus manually clamps onto CRDs adjacent to the CRD to be milled. The drill bit works straight down onto the CRD end to remove the cracked weld material and end cap. The waste product of the milling procedure is radioactive material in the form of chip-like scraps which are too heavy to remain air-borne and hence, there is virtually no dust.

For a better understanding of the above and other features and advantages, reference is made to the following and detailed description of a preferred embodiment reflected in the accompanying drawings in which like numerals in the several views refer to corresponding parts.

IN THE DRAWINGS

DETAILED DESCRIPTION OF THE DRAWINGS

Figure 1:
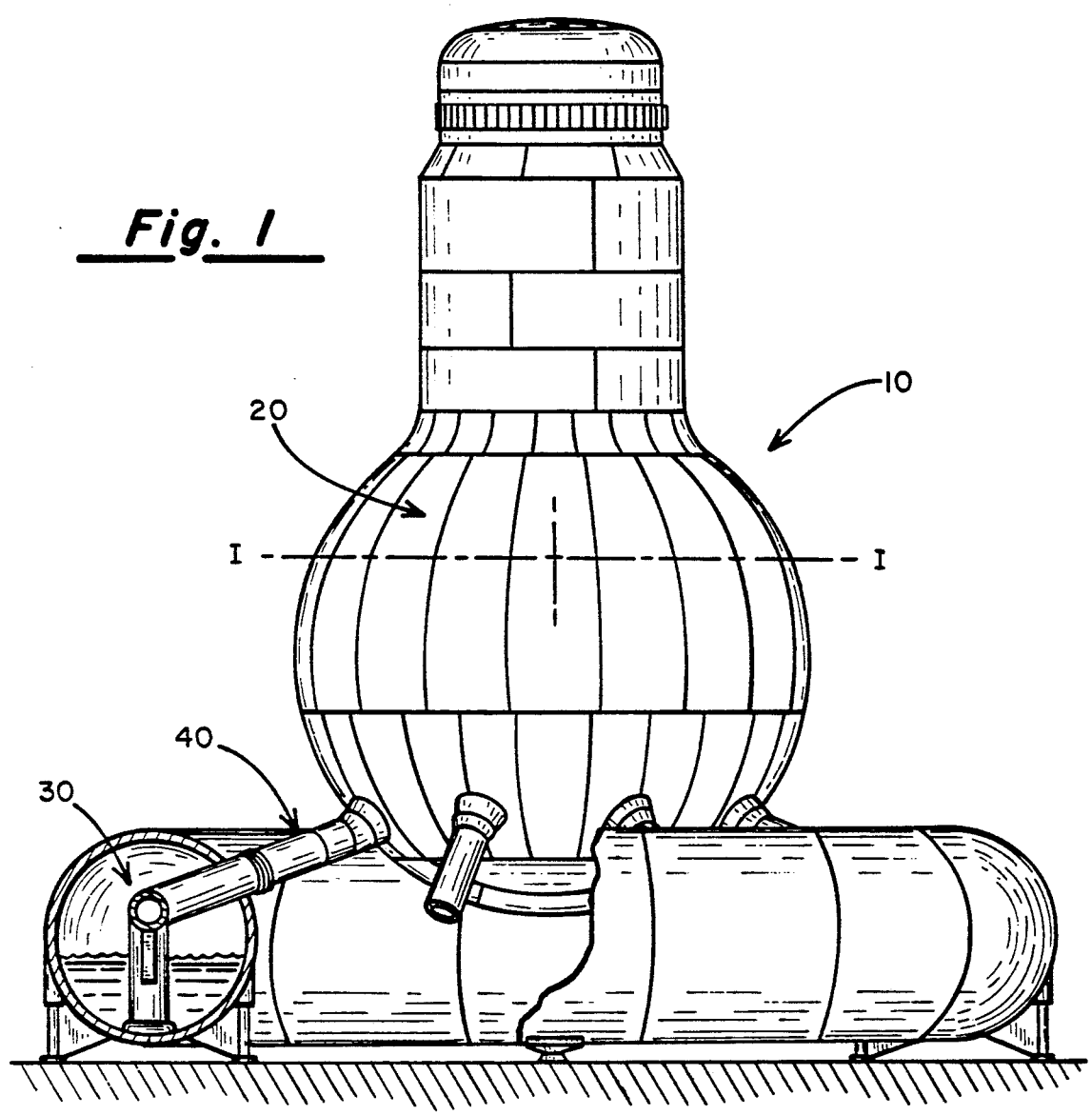
FIG. 1 is an exterior side elevation view of a nuclear boiling water reactor (BWR) with a cutaway view of the suppression chamber.

FIG. 1 shows an overview of a typical nuclear boiling water reactor (BWR) system 10. It typically may have a height of approximately 100 feet and a diameter of 50 feet. The primary reactor vessel, reactor coolant, control rod drives and other systems are housed in the dry well 20. The suppression chamber 30 contains a pool of water to condense steam which may be released within the dry well in the event of an operating accident. A vent system 40 connects the dry well 20 to the suppression chamber 30.

Figure 2:
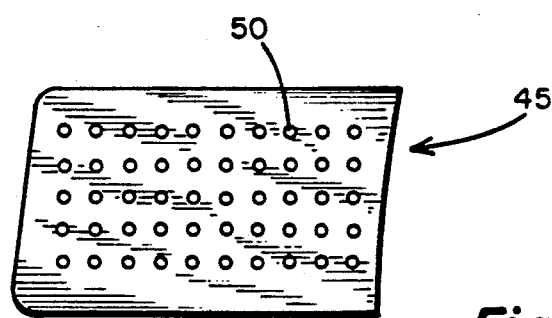
FIG. 2 is an end view of a section of the control rod drive (CRD) penetration grid used in the BWR of FIG. 1.

The approximate location of the CRD penetrations 50 through the dry well is shown in FIG. 1 by line I—I. The CRDs 50 penetrate through a wall surface 45 and are arranged in a grid pattern of equal x-y spacing as shown in FIG. 2. The tubular CRDs typically have a diameter of approximately 1.315" and are spaced on 5" centers. Each CRD has an end cap welded on the upper end.

Figure 3:
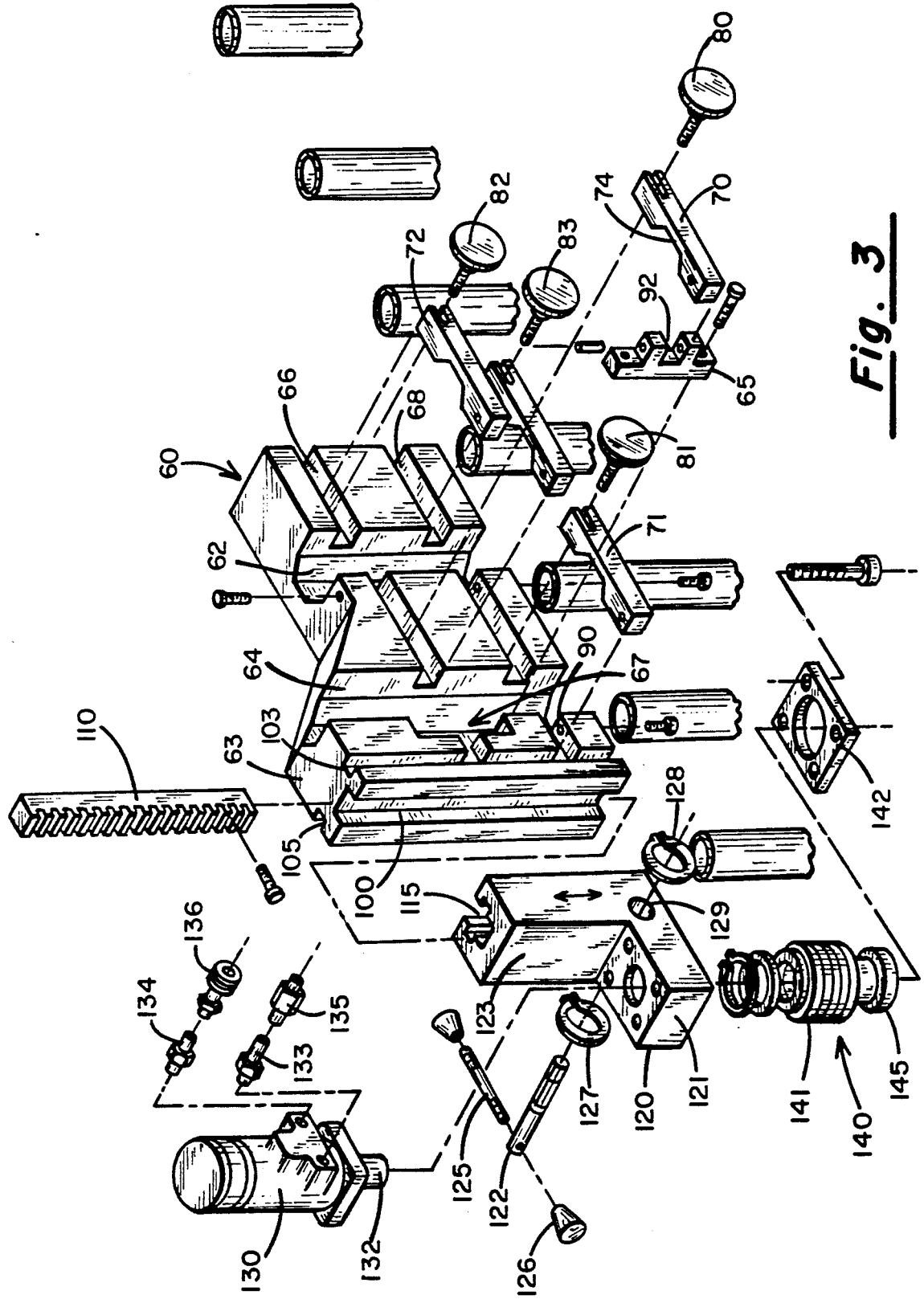
FIG. 3 is an exploded view of the milling apparatus in accordance with the present invention.
Figure 4:
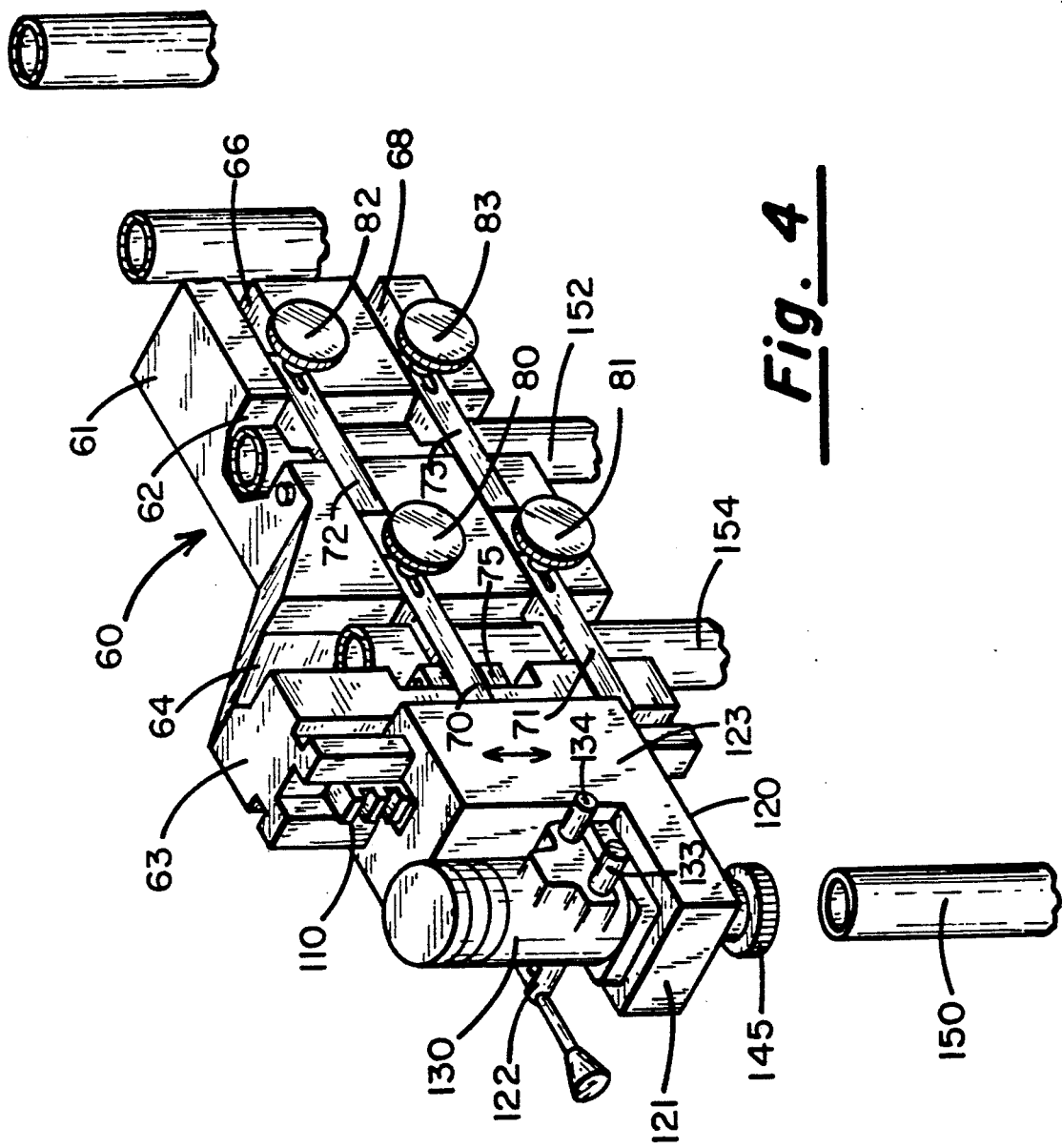
FIG. 4 is a perspective view of the milling apparatus of FIG. 3 when secured to a pair of CRD penetrations when used to refurbish a third such CRD.

With reference now to FIGS. 3 and 4, the milling device of the present invention includes a support block, clamp block 60, and a milling block 120, both of which can be fabricated from cold rolled steel. Clamp block 60 is seen to comprise an upper, generally planar portion 61 which inclines to a higher planar portion 63 to which milling block 120 is mounted. Clamp block 60 also includes at least two integrally formed CRD holders consisting of two open ended vertical slots 62 and 64 and two parallel horizontal slots 66 and 68 which will be described in further detail. Milling block 120 is vertically reciprocable with respect to clamp block 60 and supports an hydraulic motor 130 and milling drill bit 145 which will be described in further detail.

As shown in the FIGS. 3 and 4, the vertical slots 62 and 64 formed in block 60 are parallel to one another, with the same center-to-center spacing as two adjacent CRDs so as to be aligned with the longitudinal axes of the CRDs. The slots 62 and 64 may have the modified hexagonal shape which is larger than the CRD's diameter as shown in FIGS. 3 and 4. The CRD holder 64, adjacent to the milling block mount, is cut away laterally to form a rectangular notch 67 for receiving a support member 65 therein.

Track slots 66 and 68 extend transversely across the length of clamp block 60 from the edge opposite the milling block 120 transversing slots 62 and 64 to intersect with vertical slot 103. Clamping bars 70 to 73 are pivotally hinged and set into the track slots 66 and 68. Each clamping bar has a generally planar outer surface and the inner surfaces thereof have a modified partial hexagonal recess as at 74. Each clamp bar has a manually adjustable thumb screw 80–83 fitting into a threaded bore in the clamp block (not shown) for securing the bars 70-73 transversely to the vertical slots 62 and 64 of the CRD holder. When the thumb screws are tightened with the clamp bars in the closed position, the planar outer surface is generally flush with the outer surface of clamp block 60 and the inner surface completes the hexagonal enclosure of the CRD. The hexagonal shape provides a secure grip on the CRD, withstanding the vibrations of the milling process while securing the apparatus during its operation. Although a hexagonal shape is used, it is understood that an alternative embodiment which provides a similar secure grip on the CRD may be utilized.

The clamp block 60 contains three vertical longitudinal slots 100, 103 and 105 for the mounting of the milling block 120. A gear rack 110 is bolted into the groove 100 in the end face of the block 60. The groove 100 and gear rack 110 of a height such that the milling block 120 can be raised significantly above the height of the exposed end of the CRD to be milled when securing the clamp block 60 to two adjacent CRDs. Stem pinion 122 fits through bore 129 in the block 120 and engages gear rack 110 for imparting reciprocating movement to the milling block 120. Stem pinion 122 has a lever handle 125 with knobs 126 to allow sufficient torque to be applied to the pinion. The pinion fits into bore 129 and is secured therein by C-clips 127 and 128 on each end thereof.

The milling block 120 consists of a vertical portion 123 and an integrally formed horizontal portion 121. As shown, vertical portion 123 houses the stem pinion 122 and is located adjacent to clamp block 60 for engaging stem pinion 122 with gear rack 110. The horizontal portion 121 provides a base or support surface for mounting a hydraulic motor 130. The hydraulic motor 130 may be a Series 5 motor available from Charrlynn Division of Eaton Corporation. The hydraulic motor has inlet and outlet hydraulic lines 133 and 134, each with quick disconnects as at 135-136.

A motor shaft 132 extends from the motor 130 into the horizontal portion 121 of the milling block and a spindle assembly indicated generally by numeral 140 is secured to the shaft 132. A bottom plate 142 is bolted onto the bottom of horizontal portion 121 to hold the spindle bearings 141 in place. The milling bit 145 is attached to the bottom of the spindle assembly in an appropriate chuck and has a diameter which is larger than the CRD diameter.

To secure the apparatus for operation, the thumb screws 80 to 83 of the pivotally mounted bars 70 to 73 are loosened. The milling block 120 is manually positioned near the top of gear rack 110 by appropriate rotation of stem pinion 122. The device is lowered over three CRDs, positioning two CRDs, 152 & 154 into the clamp block 60 CRD holders 62 and 64 and positioning the milling device above a third CRD, 150, to be refurbished. The thumb screws 80 to 83 are then manually tightened to secure the two support CRDs in their respective holder, as best shown in FIG. 4.

Next, the milling bit is lowered onto the CRD 150 to be milled, via stem pinion 122 which engages gear rack 110. When the bit contacts the end cap and cracked weld material, the device is in a position to begin the milling operation for removing the end cap and cracked weld material. Next, the hydraulic motor is actuated. The milling bit 145 works directly down onto the CRD end. The end cap and cracked weld material are removed in the form of radioactive chips which are too heavy to remain airborne. Upon completion of CRD end treatment, the milling device is readily removed to be repositioned on an adjacent pair of CRDs for milling removal of another CRD's end cap and cracked weld material. Specifically, the device is removed by manually loosening the thumb screws 80 to 83. This releases the clamp bars 70-73 and the CRDs in holders 62 and 64, allowing the device to be lifted off. Upon manually raising the milling block by stem pinion 122 and gear rack 110, the tool bit may be repositioned over an adjacent CRD for refurbishment.

While the above provides a full and complete disclosure of the preferred embodiments of the present invention, various modifications, alternate constructions, and equivalents will occur to those skilled in the art given the benefit of this disclosure, thus, the invention is not limited to the specific embodiments described herein, but as defined by the appended claims.

What is claimed is:

1. Apparatus for refurbishing the ends of a plurality of control rods where the rods are disposed in a grid of rows and columns with a known predetermined spacing therebetween, comprising:
   a. support block means including means for rapidly clamping and unclamping said support block to two adjacent rods of said control rods in a given column or row;
   b. motor mounting means coupled to said support block means and reciprocally movable relative to said support block means in a direction parallel to the longitudinal axis of said tubular rods, said motor mounting means including a bearing housing;
   c. a rotatable spindle member journalled for rotation in said bearing housing for supporting an end mill bit, said spindle having its axis of rotation generally coaxially aligned with the longitudinal axis of a given one of said control rods when said support block means is clamped to said two adjacent ones of said tubular rods;
   d. motor means mounted on said motor mounting means in driving relation to said spindle member for rotating said spindle about its axis of rotation; and
   e. means for translating said motor mounting means reciprocally relative to said support block means for selectively bringing said end mill bit into contact with the end of said given one of said control rods as said spindle member is rotated.

2. The apparatus of claim 1 wherein said means for rapidly clamping and unclamping comprises:
   a) first and second parallel slots formed in said support block means and spaced from one another by said known predetermined spacing, said slots being aligned with the longitudinal axis of said control rods, the first and second slots having a width greater than the outer diameter of said tubular rods;
   b) a plurality of clamping bars pivotally coupled at a first end to said support block for rotation in planes transverse to said parallel slots; and
   c) thumb screw means for securing the second end of said clamping bars relative to said support block with said clamping bars intersecting said parallel slots.

3. The apparatus as in claim 1 wherein said means for translating comprises:
   a) A rack gear secured to one of said support block means and motor mounting means and extending parallel to the longitudinal axis of said control rods when said support block means is clamped to adjacent ones of said control rods;
b) a pinion gear journalled for rotation in the other of said support block means and said motor mounting means and engaging said gear rack; and
c) means for rotating said pinion gear.

4. The apparatus as in claim 1 wherein said motor means is fluid driven.

5. The apparatus as in claim 3 wherein said support block includes:
a) a pair of parallel track slots extending inwardly from opposed side surfaces of said support block;
b) a rack gear receiving slot formed inwardly from the edge surface of said support block extending between said opposed side surfaces; and
c) said motor mounting means including (i) a pair of rails for slidingly engaging said parallel track slots formed in said support block; and (ii) a pinion gear receiving bore extending transverse to said rack gear receiving slot.

6. A method of refurbishing welds on control rod drive penetrations in a boiling water nuclear reactor, said CRD's having end caps welded therein and being arranged in a grid of columns and rows comprising the steps:
a) selecting a first pair of CRDs adjacent to a given CRD to be refurbished;
b) clamping a milling machine to the selected pair, said milling machine including:
i) a support block means including means for rapidly clamping and unclamping said support block to said first pair of adjacent CRDs in a given column or row;
ii) motor mounting means coupled to said support block means and reciprocably removable relative to support block means in a direction parallel to the longitudinal axis of said given CRD, said motor mounting means including a bearing housing;
iii) a rotatable spindle member for rotation in said bearing housing and holding an end mill bit, said spindle having its axis of rotation coaxially aligned with the longitudinal axis of said given CRD to be milled when said support block means is clamped to said first pair of adjacent CRDs;
iv) motor means mounted on said motor mounting means in driving relation to said spindle member for rotating said spindle about its axis of rotation; and
v) means for translating said motor mounting means reciprocally relative to said support block means for selectively bringing said end mill bit into contact with the end of said given CRD as said spindle member is rotated;
c) advancing the end mill into contact with said given CRD to be refurbished;
d) driving the spindle until the CRD is milled down below the location of its welded end cap;
e) disengaging the end mill from contact with the milled CRD;
f) removing said milling machine from said first pair of CRDs;
g) selecting another pair of CRD's adjacent to a CRD to be refurbished in accordance with steps (a) through (d).

* * * * *